United States Patent [19]

Newbould

[11] Patent Number: 5,467,245
[45] Date of Patent: Nov. 14, 1995

[54] ANTI-ABUSE CIRCUIT

[76] Inventor: John M. Newbould, 1 Tigrone Blvd., Avon, N.C. 27915

[21] Appl. No.: 79,528

[22] Filed: Jun. 22, 1993

[51] Int. Cl.$^6$ .................... G05D 23/00; H01H 47/00
[52] U.S. Cl. .................... 361/170; 307/117; 62/158; 236/46 R
[58] Field of Search .................... 361/170, 152, 361/195–202; 307/117, 140, 132 E, 141, 141.4; 62/158, 231; 236/46 R

[56] References Cited

U.S. PATENT DOCUMENTS

| | | |
|---|---|---|
| 3,721,866 | 3/1973 | McIntosh . |
| 3,796,892 | 3/1974 | Stewart . |
| 3,979,059 | 7/1976 | Davis et al. . |
| 4,045,973 | 9/1977 | Anderson et al. . |
| 4,094,166 | 6/1978 | Jerles . |
| 4,142,375 | 3/1979 | Abe et al. . |
| 4,209,995 | 7/1980 | Ferdelman . |
| 4,453,590 | 6/1984 | Holliday et al. . |
| 4,487,028 | 12/1984 | Foye . |
| 4,622,827 | 11/1986 | Jabami et al. . |
| 4,709,292 | 11/1987 | Kuriyama et al. . |
| 4,731,551 | 3/1988 | Gibbs et al. ............ 307/141 |
| 4,939,909 | 7/1990 | Tsuchiyama et al. . |
| 4,991,049 | 5/1991 | Kadah . |

Primary Examiner—A. D. Pellinen
Assistant Examiner—Fritz M. Fleming
Attorney, Agent, or Firm—Dennison, Meserole, Pollack & Scheiner

[57] ABSTRACT

An anti-abuse circuit and method is described for shutting down a load wherein the load is connected to a controller having a predetermined range and demanding operation of the load through a relay until the predetermined temperature range is achieved. The anti-abuse circuit is positioned between the controller and the load. The anti-abuse circuit controls the relay when a demand signal is present indicating the operation of the load. The anti-abuse circuit energizing the relay during the predetermined time period and receipt of the regulated demand signal. The anti-abuse circuit de-energizing the relay when either the predetermined time period expires or the regulated demand signal stops.

12 Claims, 2 Drawing Sheets

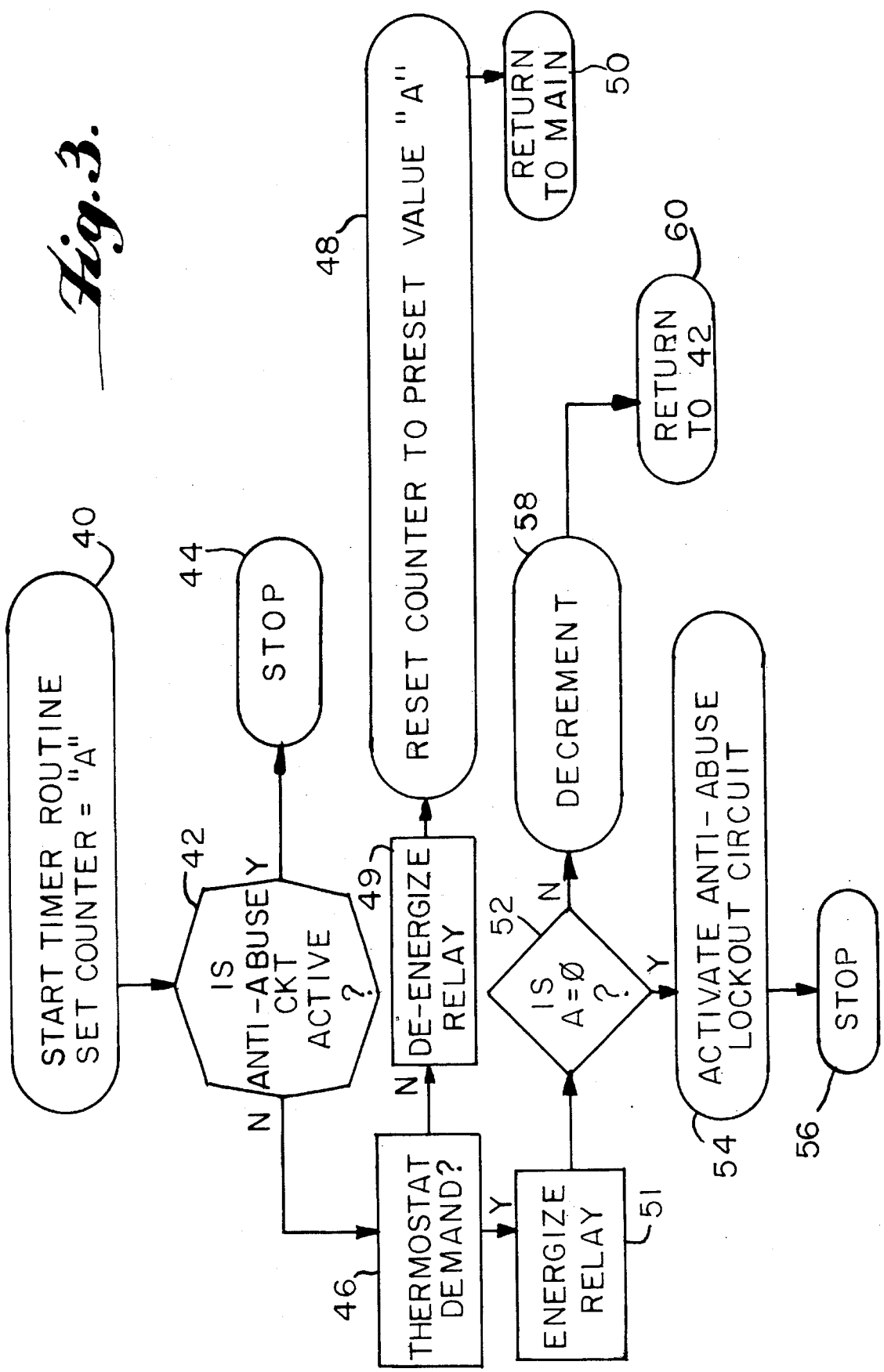

ANTI-ABUSE CIRCUIT

BACKGROUND OF THE INVENTION

FIELD OF THE INVENTION

The present invention relates to a pre-determined time delay of continuous compressor operation. In the present invention, a compressor control system is locked out by anti-abuse circuitry after a predetermined demand is not satisfied. The circuitry will be reset automatically when the duty cycle has been normally satisfied. More specifically, the anti-abuse circuitry halts or prevents operation when the compressor control system is being operated inappropriately.

Many weekly rental houses in warm resort areas require large capacity air conditioning units. The renters often leave such units running with doors and windows open. (Since they are not paying the electric bill and human nature being what it is; they feel indifferent about energy conservation on vacation.) This is so prevalent that a device to restrict such wanton waste would be worthwhile. Most air conditioning units, properly installed, should cycle under thermostatic controls satisfying demand within an hour or so. If a timer is installed in a compressor control system, a continuous "overload" condition can be determined and the unit disabled.

Properly designed, sized and installed refrigeration, heating and air conditioning equipment is supposed to cycle "off" once the desired temperature is achieved. However, an otherwise normally operating refrigeration, heat pump or air conditioning system can be abused and waste large amount of electricity as a result. For example, in the hotel or vacation home rental business, patrons often are not aware of the expense of such waste. They regularly leave doors and windows open with the air conditioning system running. This results in the cooling equipment compressor running continuously. The thermostat will never be satisfied and since the compressor is running normally, routine electrical overload, pressure switches and restart timers will not prohibit such abuse. It would, therefore, be desirable to overcome this condition by monitoring the duty cycle of the compressor through timing of the thermostat demand for heating or cooling and provide means to disable this circuit when such condition occurs.

The prior art has not recognized this abuse based on thermostat demand. Instead, the function and purpose of the patents in the prior art has been to protect the mechanical and electrical parts of a refrigeration system for electrical disturbance, mechanical malfunction, and or adjust the capacity and or identify the cause of a malfunction of the equipment itself. The patents to Kadah (U.S. Pat. No. 4,991,049), Abe et al. (U.S. Pat. No. 4,142,375), Stewart (U.S. Pat. No. 3,796,892), and McIntosh (U.S. Pat. No. 3,721,866) all provide time delays to prevent restart of the compressor system. The Tsuchiyama et al. (U.S. Pat. No. 4,939,909) and Kuriyama et al. (U.S. Pat. No. 4,709,292) patents additionally provide various mechanical and electrical overload protection. The Anderson et al. (U.S. Pat. No. 4,045,973) patent further provides a display indicating the probable cause of a malfunction. The Foye (U.S. Pat. No. 4,487,028), Holliday et al. (U.S. Pat. No. 4,453,590) and Jabami et al. (U.S. Pat. No. 4,622,827) patents provide for modulating the systems capacity according to the load and the Ferdelman patent (U.S. Pat. No. 4,209,995) provides several operating modes. Davis et al. (U.S. Pat. No. 3,979,059) and Jerles (U.S. Pat. No. 4,094,166) both address the issue of outside temperature and limit system operation when it would be better to ventilate rather than cool. None of the noted patents address the abuse problem recognized by the present invention. In fact, a goal of the present invention is to provide a simple solution to this unaddressed problem.

SUMMARY OF THE INVENTION

An anti-abuse circuit for shutting down a load wherein the load is connected to a thermostat having a predetermined temperature range and demanding operation of the load through a relay until the predetermined temperature range is reached. The anti-abuse circuit is positioned between the thermostat and the load for controlling the relay when a demand signal is present.

It is an object of the invention to have a power supply means connected to the thermostat for receiving the demand signal and regulating the demand signal.

It is another object of the invention to have timing means connected to the power supply means for receiving the regulated demand signal, wherein the timing means operating for a predetermined time period as long as the regulated demand signal exist.

Another object of the invention is to have triggering means connected to the power supply means and the timing means for initially pulsing the timing means upon indication of the regulated demand signal.

An advantage of the invention is that the anti-abuse circuit energizing the relay during the predetermined time period and receipt of the regulated demand signal and thus de-energize the relay when either the predetermined time period expires or the regulated demand signal stops.

Another advantage of the invention is that the anti-abuse circuit comprises a 555 timer.

A further object of the invention is to have a diode for rectifying the demand signal from the thermostat.

A still further object of the invention is to have a regulator for regulating the demand signal from an alternating current to a direct current.

Additionally, it is an advantage of the invention to have a capacitor connected to the output of the regulator for buffering the direct current against transients.

Another object of the invention is to include a bypass switch connected between the relay and the thermostat for bypassing the de-energizing of the relay.

An object of the invention is to have a method of shutting down a load connected to a thermostat having a predetermined temperature range and demanding operation of the load by energizing a relay until the predetermined temperature range is met at which time the thermostat de-energizing the relay.

Another object of the invention is to enter a time routine by setting a count to a predetermined number upon receipt of a demanding signal during the demanding operation.

A still further object of the invention is to determine if an anti-abuse circuit is activated and shutting down the relay during activation of the anti-abuse circuit.

An advantage of the invention is the checking if the thermostat is demanding operation of the load, and resetting the timing routine as well as de-energizing the relay.

Another advantage of the invention is comparing the count to zero and decrementing the count if not zero then returning to the step of determining.

A further advantage of the invention is activating the anti-abuse circuit to lockout the load from receiving the demand signal from the thermostat by de-energizing the relay.

Further objects and advantages of the invention will become apparent from a consideration of the drawings and ensuring description of it.

BRIEF DESCRIPTION OF THE DRAWINGS

FIG. 3 is a flow diagram of a method for operation of the present invention.

DESCRIPTION OF THE INVENTION

Figure 1:
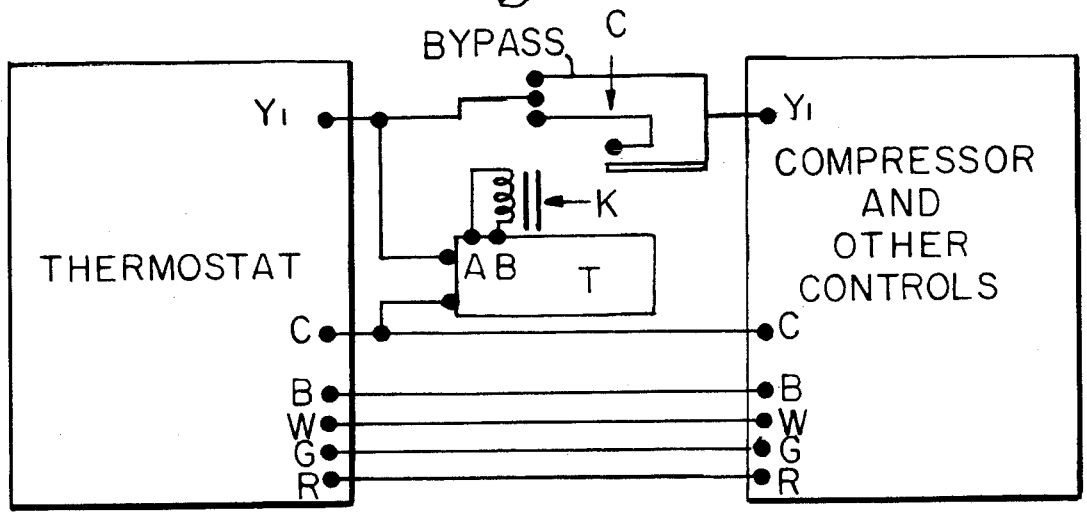
FIG. 1 is a block diagram of the basic circuit showing the necessary parts and connections adjacent to the electronic timer.

With reference to the FIG. 1, the block diagram illustrates the basic principles of the invention. When an input wire Y1 coming from a thermostat is energized, a timer circuit T is energized and triggered into operation. The output from the timer at terminals A–B are energized to cause relay K to pick-up. This action causes the current from Y1 to pass through the contacts C of the relay and on to the remaining compressor control circuit wire Y1. No further action takes place until the time delay has been exceeded. The compressor is connected to thermostat with the normal red (R), green (G), white (W) and black (B) connections. Should the system be running normally, the demand for cooling as indicated from the thermostat at Y1 will be removed prior to the full time period. When this occurs, the timer is reset and upon future demand, the circuit repeats the sequence as just described.

However, when the system is being abused, as previously described, the demand is never satisfied. The timer remains energized from the thermostat at Y1 and the timer reaches the end of its period. When this occurs, the timer de-energizes relay coil K, contacts C open and de-energize the remaining compressor control circuit Y1. The timer will not reset until the power from Y1 is removed. Therefore, the compressor circuit remains locked-out until this occurs.

Figure 2:
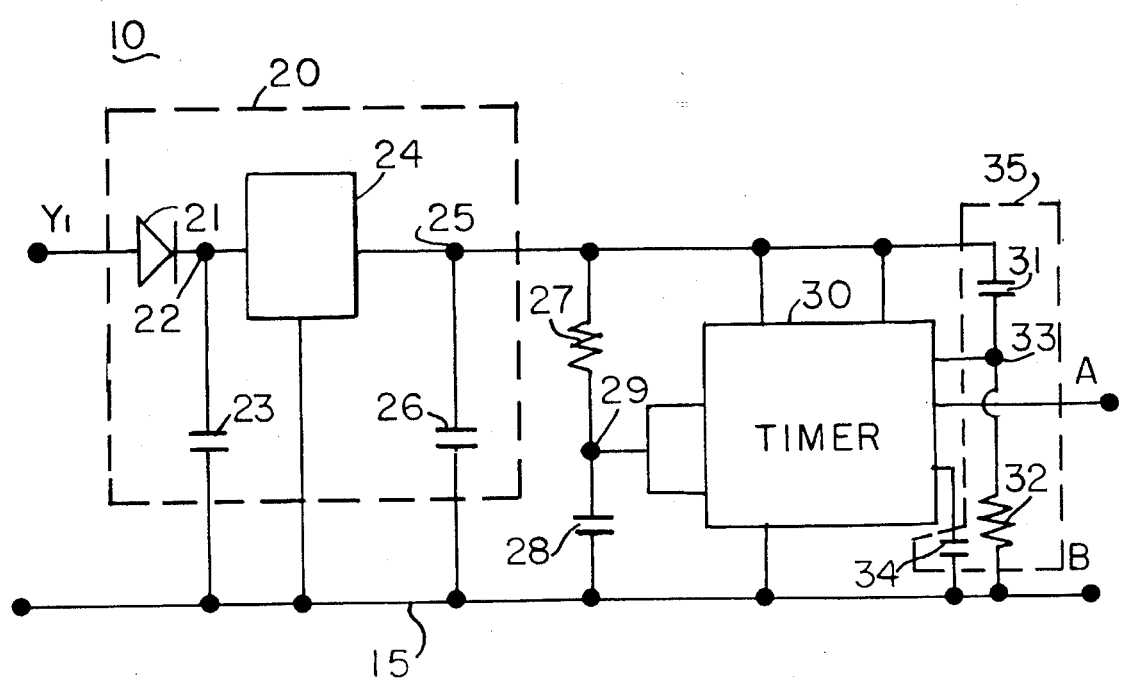
FIG. 2 is a detailed schematic of the electronic timer itself.

With reference to FIG. 2, the circuit diagram illustrates the support circuitry external to the popular 555 integrated circuit timer.

Control voltage of approximately 24 volts alternating current is provided to the timer circuit, generally indicated by the numeral 10, via terminal Y1 as described previously. This voltage is rectified by diode 21, a 200 P.I.V. one amp device. The direct current voltage of approximately eighteen volts obtained from the diode 21 at point 22 is filtered by a 100 microfarad condenser 23 whose other plate is connected to the common return line 15. The filtered current at point 22 then passes to the input of an integrated circuit voltage regulator 24, a 7812 device, whose output at point 25 is a regulated 12 volts direct current. The regulator 24 has a ground terminal, to stabilize regulation, which is connected to common line 15. The current at point 25 is further buffered against transients by the 100 microfarad condenser 26. Therefore the parts 21, 23, 24, and 26 comprise a classic 12 volt power supply, generally indicated by numeral 20.

Parts 27 and 28, a 10 megohm resistor and 220 microfarad capacitor respectively, provide the timing adjustment for the circuit. Resistor 27 connects the power supply 20 to a junction point 29. Point 29 then continues to capacitor 28 whose other plate is tied to the ground point 15. Point 29 connects to the Threshold and Discharge pins of 30, a 555 integrated circuit timer. The timer 30 also is connected to the positive supply 25 for power (Vcc). The internal flip-flop reset pin of the timer 30 is connected to the 12 volt positive supply 20. The timer's ground pin is connected to ground at point 15.

Triggering of the timing cycle is provided by capacitor 31, a 1 microfarad device, and a resistor 32, a 20 kilohm device. Capacitor 31 connects from the positive supply 20 to a junction point 33. Point 33 then continues to resistor 32 whose other end is tied to the common ground line 15. This circuit 35 provides a pulse at point 33 when power is first applied. This pulse at point 33 is connected to the timer integrated circuit 30 trigger input pin. False triggering is eliminated by capacitor 34, a 0.1 microfarad device, connected from the control voltage pin of the 555 timer 30 and to ground point 15. Output of the timer integrated circuit 30 is connected to point A which is the same point as in FIG. 1. The common ground line 15 provides a return path for the output circuit at point B which also corresponds to FIG. 1.

FIG. 3 illustrates a flow diagram for the present invention. In the most basic terms, the flow diagram is a subroutine designed for the operation of the timer circuit and the anti-abuse lockout circuit. The routine begins operation as soon as there is a demand placed on the thermostat. This demand could be a preset controller wherein the temperature inside increases and the system attempts to maintain a constant temperature. Alternatively, the routine could be set to operate, initially, to cool the inside of a building or house.

In block number 40, an initial demand for temperature change has been made on the system. Upon receipt of this demand, the timer routine begins. In this routine, the count has been preset with a value "A". This value can be selected by the user or preprogrammed into a controller chip (not shown).

In block 42, the routine checks the anti-abuse circuit. If the anti-abuse circuit is activated, the routine immediately acts to stop the system, as indicated by numeral 44, including the compressor. This action could be caused by a number of different variables. Most likely, the system has been already running or the system has recently been abused and, thus, shut-down.

Alternatively, block 42 will indicate that the anti-abuse circuit is not activated. The routine then proceeds to block 46. Here at block 46, the routine checks to see if the thermostat is still on demand. In other words, has the thermostat reached the demand point or does the system still demand temperature change. If the thermostat is no longer on demand, the routine moves to block 48. At block 48, the routine basically reinitializes the counter back to its original reset value and de-energizes the relay block 49. Then, as indicated by block 50, the routine returns to the main program. Of course, the demand on the thermostat may still be on in which case the routine moves to block 51 and energized the relay, then to block 52 to check the counter. The routine utilizes a count down type count, so once the count equals zero, the routine moves into block 54 and activates the anti-abuse lockout circuit. The routine stops after activation and the compressor is shut down in block 56.

Alternatively, the routine could check the count and note that it has not counted down to zero. If this is the case, then the routine moves to decrement the count in block. After the count is decremented, the routine is forced to return in block 60 back to block 42 and the routine is followed again.

While the previous description contains many specificities, these should not be construed as limitations on the scope of the invention, but rather as exemplification of one preferred embodiment thereof, and many other variations are possible. For example, it is has been contemplated to modify the timing circuit or routine program by additional temperature sensing devices, such as a thermistor or other similar device, to adjust the timing value based on outside temperature or other variables. One such modification could be the replacement of resistor 27 with a thermistor. Accordingly, the scope of the invention should be determined not by the embodiment illustrated, but by the appended claims and their legal equivalents.

I claim:

1. An anti-abuse circuit for shutting down an energy load wherein said energy load is a compressor connected to controller means for demanding operation within a predetermined operating temperature range of said compressor through a relay in the predetermined operating temperature range, said anti-abuse circuit positioned between said controller means and said compressor for controlling said relay when said demanding means outputs a demand signal indicating operation of said compressor in said predetermined operating temperature range, said anti-abuse circuit comprising:

power means connected to said controller means for receiving said demand signal and for regulating said demand signal, said power means providing power to said compressor through said controller means during said predetermined operating temperature range;

timing means connected to said power means for receiving the regulated demand signal, said timing means operating for a predetermined time period as long as said regulated demand signal exists;

triggering means connected to said power means and said timing means for initially pulsing said timing means upon indication of said regulated demand signal; and said anti-abuse circuit energizes said relay during said predetermined time period and said receipt of said regulated demand signal and de-energizes said relay when either said predetermined time period expires or said regulated demand signal stops.

2. The anti-abuse circuit of claim 1 wherein said timing means comprises a 555 timer.

3. The anti-abuse circuit of claim 1, wherein said power supply means comprises a diode for rectifying said demand signal from said controller.

4. The anti-abuse circuit of claim 3, wherein said power supply means further comprises a regulator for regulating said demand signal from an alternating current to a direct current.

5. The anti-abuse circuit of claim 4, wherein said power supply means further comprises a capacitor connected to the output of said regulator for buffering the direct current against transients.

6. The anti-abuse circuit of claim 1, wherein said controller includes a thermostat.

7. A method of shutting down an energy load wherein said energy load is a compressor and is connected to controller means having a predetermined operating temperature range and demanding operation of said compressor by energizing a relay up to said predetermined operating temperature range at which time said controller means de-energizing said relay, said method comprising the steps of:

entering a timing routine by setting a count to a first predetermined limit upon receipt of a demand signal during said demanding operation;

determining if an anti-abuse circuit is non-active, if said anti-abuse circuit is non-active and said demanding operation is non-existent then de-energizing said relay and resetting said count, if said anti-abuse circuit is non-active and said demanding operation exists, then energizing said relay;

comparing said count to a second predetermined limit and decrementing said count if greater than said second predetermined limit, then returning to said step of determining, otherwise if said count equals said second predetermined limit activating the anti-abuse circuit to lockout said compressor from receiving the demand signal from said controller means by de-energizing said relay.

8. The method of shutting down a load of claim 7, further including the steps of:

regulating said demand signal through a power supply connected to said controller for receiving said demand signal; and operating timing means for a predetermined time period as long as said regulated demand signal exist.

9. The method of shutting down a load of claim 8, comprising the steps of:

pulsing timing means upon indication of said regulated demand signal; and energizing said relay during said predetermined time period and said receipt of said regulated demand signal and de-energizing said relay when either said predetermined time period expires or said regulated demand signal stops.

10. The method of shutting down a load of claim 9, comprising the steps of:

rectifying said demand signal from said controller; and regulating said demand signal from an alternating current to a direct current.

11. The method of shutting down a load of claim 10, comprising the step of:

buffering the direct current against transients.

12. The method of shutting down a load of claim 7, comprising the step of:

connecting a bypass switch between the relay and the controller for bypassing the de-energizing of said relay.

\* \* \* \* \*